Sept. 5, 1933.　　　　W. E. OSTER　　　　1,925,816
FASTENER
Filed Jan. 18, 1932
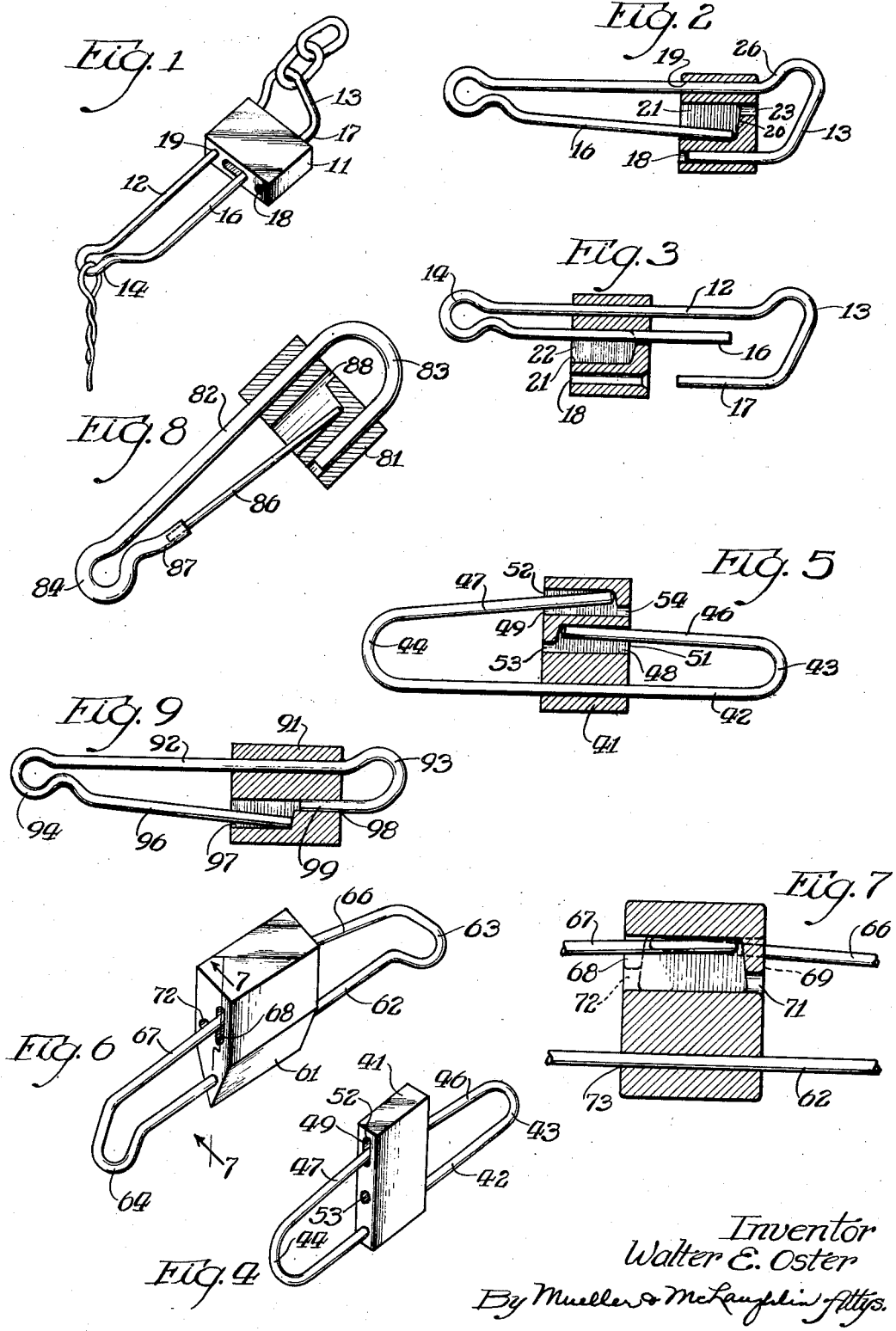
Inventor
Walter E. Oster
By Mueller & McLaughlin Attys.

Patented Sept. 5, 1933

1,925,816

UNITED STATES PATENT OFFICE 1,925,816

FASTENER

Walter E. Oster, Chicago, Ill.

Application January 18, 1932. Serial No. 587,238

12 Claims. (Cl. 24—238)

My invention relates to fastening devices and more particularly to a fastener adapted to serve the same general purpose as a well known snap fastener.

The conventional type of snap fastener has a straight shank with a hooked end, and a spring member extending from the shank and bearing against the inner side of the outer point of the hooked end to form a completely closed link, one side of which is a movable spring. The effectiveness of this type of snap is limited by the resiliency of the spring, for if the spring member drops away from contact with the hooked end of the shank an object linked thereover will slip off.

There are many variations in the above described type of snap, but practically all depend upon considerable tension in the closing spring member. As a result, if the spring is made strong enough to support a heavy load, it requires a great deal of pressure to move the spring member, such pressure to be ordinarily applied by a finger or thumb. In some instances the person using the snap has not sufficient strength to move the spring by means of the thumb or finger, and in other instances if it can be moved it is with much difficulty.

An object of my invention is to provide a fastening device or snap in which its locking effectiveness is not alone dependent upon the tension maintained in a movable spring member.

Another object is to provide a fastener with a positive locking means operated with a very little effort, but capable of supporting a heavy load.

A further object is to provide a fastening device which may be adapted to readily link any two linkable objects together.

A further object is to provide a fastening device or snap simple in operation and inexpensive to produce, and A still further object is to provide a slide snap with a long life, maintaining certain locking characteristics during its entire life.

Other objects and advantages will be apparent as the description proceeds.

Referring to the drawing:

Fig. 1 is a perspective of a simple fastening device in a closed position, embodying the principles of my invention;

Fig. 2 is a side elevation of the closed snap with the locking member in cross section;

Fig. 3 is a side elevation of the snap open to receive an object, and the locking member in cross section;

Fig. 4 is a perspective of a modified embodiment of my invention;

Fig. 5 is a side elevation of the fastener of Fig. 4, with the locking member in cross section;

Fig. 6 is a perspective of a further modified embodiment of the principles of my invention;

Fig. 7 is a cross sectional view of the locking member along line 7—7 of Fig. 6;

Fig. 8 is a side elevation of a further modification with the locking closure in cross section; and Fig. 9 is a side elevation of a further modification with the locking closure in cross section.

In accomplishing the invention I provide a hooked shank having a spring member in approximate alignment therewith, and a hook closure member slidable on the shank and spring to either open or close the hook portion. Means including said spring and closure member are provided for releasably holding the sliding closure member in a position to close the hook.

Referring now to Figs. 1-3 of the drawing I provide in one embodiment of my invention a fastener with a frame upon which a sliding locking closure 11 is held. The frame is composed of a straight shank 12 and each end rounded to form an offset link 13 at one end and an offset eyelet 14 at the other end. A straight movable spring member 16 is integral with the latter. The offset link 13 ends in a hooked prong 17. The frame is of a strength and the movable spring 16 of a strength and resiliency dependent upon the use to which it is put.

The sliding locking closure 11 has an oblong shape with apertures 18 and 19 adjacent its ends and extending therethrough. The sliding closure 11 also has a chamber 21 having a wide rectangular opening 22 at the bottom, and closing to an aperture 23 extending from the top of the chamber 21 through the locking closure 11. This aperture 23 like apertures 18 and 19 is of a size to allow sliding of the closure 11 over the frame. Aperture 18 is bevelled at the top to allow easy access of the prong 17 thereto. The top or locking shoulder 20 of the chamber 21 is at a small angle with the horizontal to conform to an arc formed by the end of the movable spring 16, when said spring 16 is moved from the position shown in Fig. 2 to the aperture 23.

Offset link 13, and offset eyelet 14 are so shaped that when the snap is used in fastening two objects together, the force in either direction will be exerted on a line with the shank 12 thus making the force exerted on the movable spring 16, and prong 17 negligible.

In this embodiment of my invention the shoulder 26 of the offset link 13 limits the movement of the locking closure 11 in that direction, and the angle of the top of the chamber 21 prevents any play in the closure member 11, in any position of the spring 16, except when in alignment with aperture 23.

In the operation of this device, considering it in the position shown in Fig. 2, movable spring 16 is depressed to a position in the locking chamber 21 with its end point opposite the aperture 23. The sliding closure 11 is then slidably moved away from the offset link 13 to a position whereby the movable spring 16 is extended through the aperture 23, and the end of the prong 17 is free of the closure. This makes it possible to slip a linkable object thereover, to be locked thereon when the sliding closure 11 is moved back to the locking position shown in Fig. 2. This embodiment adapts itself for use as a snap in fastening parts of a harness together, fastening a leash to a dog's collar, a fish bait to a leader as a key ring and many other like uses.

The embodiment of my invention shown in Figs. 4 and 5 employs a sliding closure 41, slidable on a frame composed of a straight shank 42 formed into elongated hooks 43 and 44 on either end. Hooks 43 and 44 terminate in movable spring members 46 and 47. The closure member 41 slides to an open or closed position of the snap over shank 42, and movable spring members 46 and 47. Locking closure 41 is composed of locking chambers 48 and 49 constructed parallel to one another, and in the same transverse plane. These chambers have rectangular openings 51 and 52 at opposite ends of the member 41, each chamber closing into an aperture at its top numbered respectively 53 and 54.

When desiring to hook the link of a chain over one or the other ends of the snap, hook a key thereon or the like, one or the other of the spring members is depressed, and locking member slid over same. For instance, if it is desired to use hook 44, movable spring member 46 is depressed in the chamber 48 until its point is in alignment with aperture 53. Locking closure 41 is moved to the right (looking at Fig. 5), over the shank 42 and spring member 46, the latter extending through aperture 53. The locking closure 41 is moved far enough to the right to open the hook 44, and the object may be inserted thereon.

A like operation is necessary in order that an object may be linked to hook 44.

Figs. 6 and 7 illustrate another embodiment of my invention wherein I provide a straight shank 62 with offset links 63 and 64 at either ends, and terminating in movable spring members 66 and 67 respectively. Sliding closure 61 is slidable on shank 62 and spring members 66 and 67 closing the hooked portions when in locking position as shown in either figure.

Sliding closure 61 is composed of two locking chambers of like construction as locking chamber 21 in the snap of Fig. 1. The chambers in closure 61 are disposed in parallel transverse planes, having openings 68 and 69 closing to apertures 71 and 72 which open into opposite ends of the sliding closure 61. Shank 62 extends through aperture 73 in the closure member 61.

When it is desired to snap an object over hook 63 for instance, movable spring member 67 is depressed until its end is in alignment with aperture 71. Sliding closure 61 is then moved toward offset link 64, sliding on shank 62 and movable spring member 67 to a position whereby spring member 66 is released from the locking closure 61, and any linkable object may be slipped thereon. A similar operation is necessary if it is desired to link an object to offset link 64.

With a construction as shown in Figs. 6 and 7 either hooked end is equally accessible for linking objects thereon, simply by moving the sliding closure away from the end which it is desired to release. With the locking chambers 68 and 69 formed in parallel transverse planes a compact, sturdy closure member results which will operate under very heavy loads. When a force is applied in either direction on the snap, the objects linked thereon will take a position in the offset links such that the force is exerted on a line with the shank 62, whereby a maximum load may be accommodated without possibility of the offset links being pulled out of shape.

Fig. 8 illustrates a further embodiment of my invention in which I provide a snap with shank 82, a hook 83 at one end, and an eyelet 84 at the other end, to which a movable spring member 86 is secured. The locking closure 81 slides on the shank 82 and movable spring member 86, and is of like design as the locking closure 11 described in connection with the device of Figs. 1 to 3. This embodiment of the invention as shown in Fig. 8 is directed particularly to a snap having a hooked shank, which may be cast or forged from a very heavy material, said snap adapted for use with chains on cranes, dredges and heavy construction material. Employing the principles of my invention it is possible to use a fastener made of very heavy stock, and instead of depending alone on a movable spring for closing the same, depend on a combination of a movable spring and sliding locking closure. With the latter construction the movable spring may be of much lighter stock, and of a resiliency such that it can be moved with the hand, or thumb or finger thereof.

The spring 86 may be secured to the end of the eyelet 84 in a number of ways as by riveting or bolting thereto, or by threadably securing thereto. I have illustrated the latter means in Fig. 8, whereby the end of the spring member is threaded, and screwed into threads cut in a drilled hole in the prong 87 of the eyelet 84. If detachably secured to the eyelet 84, the spring member 86 may be replaced should it ever become necessary during the life of the hooked shank.

The snap illustrated in Fig. 8 will operate in the manner of the other embodiments with the locking closure 81 sliding on the shank 82 and spring member 86 when the latter is depressed into alignment with the aperture 88 in the closure member.

Fig. 9 illustrates a further embodiment of my invention in which I provide a fastener having a shank 92, an offset link 93 at one end, and an eyelet 94 at the other end. A movable spring member 96 is integral with the eyelet 94 and extends approximately parallel with the shank 92. A closure member 91 is slidable on the shank 92 and spring member 96, and adapted to close the link 93 so as to close the fastener. The closure member 91 has a locking chamber 97 constructed in the same manner as the locking chamber 21 of Fig. 2. It also has an aperture 98 extending from the top of the locking chamber through to the top of the closure member 91. However, in this modified embodiment the prong or end portion 99 of the link 93, fits into the aperture 98.

In the operation of this embodiment and considering the fastener in the position shown in Fig. 9, the spring member 96 is depressed until in alignment with the prong 99. The closure member 91 is then moved toward the eyelet, sliding on the shank 92 and spring member 96, until the end portion of the link 93 is free of the closure member. Any linkable object may then be slipped thereon. With this embodiment it is possible to have a compact closure member utilizing the aperture above the locking chamber, as a receiving aperture for the end portion 99 of the link 93.

It will be understood that the nature and embodiment of the invention herein described and illustrated are merely convenient and useful forms of the invention and that many changes and modifications may be made therein without departing from the spirit and scope of the invention.

What I claim as new and desire to protect by United States Letters Patent is:

1. A fastener comprising a shank with links at either end terminating in movable spring members lying in the plane of said shank, and having overlapping ends, a closure member slidable on said spring members and shank to open or close the links, and means including said springs and said closure member for releasably holding the closure member in a position to close the fastener.

2. A fastener comprising a shank with links at either end terminating in movable spring members substantially parallel with said shank, and having overlapping ends, a closure member slidable on said spring members and shank to open or close the links, said closure member including locking chambers disposed in parallel transverse planes adapted for releasably holding the spring members therein.

3. A fastener comprising a shank with links at either end terminating in movable spring members substantially parallel with said shank, and having overlapping ends, a slidable closure member to open or close the links, said closure member including locking chambers disposed in parallel transverse planes, each of said chambers having an enlarged opening at one end connecting by an internal locking shoulder to a smaller aperture at the other end, said chambers adapted for releasably holding the spring members therein.

4. A fastener comprising a shank with links at either end terminating in movable spring members lying in the same plane with said shank and substantially parallel therewith, a closure member slidable on said shank and spring members, to open or close the fastener, said closure member having locking chambers paralleling one another in the same transverse plane adapted for releasably holding the spring members therein.

5. A fastener comprising a shank with links at either end terminating in movable spring members lying in the plane of said shank and substantially parallel thereto, a closure member slidable on said shank and spring members to open or close the fastener, said closure member having locking chambers paralleling one another in the same transverse plane, each having an enlarged opening at oppositely disposed ends, and connecting by an internal locking shoulder to a smaller aperture at the other end, said chambers adapted for releasably holding the spring members therein.

6. A fastener comprising a frame having a straight shank, an offset link at one end, and an offset eyelet at the other end thereof, said offset link having an end part substantially parallel to the shank, and said eyelet terminating in a movable spring member lying in the plane of said shank and substantially parallel therewith, a slidable closure member apertured around said shank and parallel end part of said link, and means including the spring member and closure member for releasably holding said closure member in a position to close the fastener.

7. A fastener comprising a frame having a straight shank, an offset link at one end, and an offset eyelet at the other end thereof, said offset link having an end part substantially parallel to the shank, and said eyelet terminating in a movable spring member lying in the plane of said shank and substantially parallel therewith, a slidable closure member apertured around said shank and parallel end part of said link, an internal locking chamber in said closure member intermediate said apertures, having an enlarged opening at one end and closing to a smaller aperture at the other end, with said chamber adapted for releasably holding said spring member therein.

8. A fastener comprising a shank having a hook portion at one end and an eyelet at the other end thereof, terminating in a movable spring member, said hook portion having an end part substantially parallel to the shank, a closure member slidable on said shank and spring member, and apertured to extend around the shank and over the parallel portion of the hook, said latter aperture opening into an internal locking chamber in said closure member for releasably holding the spring member therein whereby to lock the closure member on the shank to close the hook.

9. A fastener comprising a frame having a straight shank, an offset link at one end, and an offset eyelet at the other end thereof, said offset link having an end part substantially parallel to the shank, and said eyelet terminating in a movable spring member in approximate alignment with the end part of the link, a slidable closure member apertured around said shank, and having a locking chamber therein, said chamber comprising an enlarged opening at one end connecting by a locking shoulder to a smaller orifice at the other end, with said end part of the link fitting in said orifice, and said spring member held in said locking chamber against the locking shoulder to lock the closure member on the shank to close the link.

10. A fastener comprising a shank having a fastening loop, a closure member slidable on said shank, said member having a locking chamber therein comprising an enlarged opening at one end connecting by an internal locking shoulder to a smaller orifice at the other end, a spring locking member carried by said shank and movable in the chamber, said spring member held in said locking chamber against the locking shoulder to lock the closure member on the shank to close the loop, and whereby the spring member may be preliminarily manually depressed to a point opposite the smaller orifice to unlock the closure member and thereafter permit movement thereof along the shank to open the loop.

11. A fastener comprising a shank having a fastening loop on both ends, a closure member slidable on said shank, said member having parallel locking chambers therein, said chambers comprising oppositely disposed enlarged openings, each of said openings connecting by an internal locking shoulder to a smaller orifice at the other end of the chamber, spring locking members carried by said shank and movable in the chambers, each of said spring members held in a locking chamber against a locking shoulder to lock the closure member on the shank to close the loops, and whereby each of the spring members may be preliminarily manually depressed one at a time to a point opposite the smaller orifice to unlock the closure member and thereafter permit movements thereof along the shank to open the loop at the end opposite that depressed spring member.

12. A fastener comprising a shank having a hook portion at one end and an eyelet at the other end thereof terminating in a movable spring member, said hook portion having an end part substantially parallel to the shank, a closure member apertured to extend around the shank and over the parallel portion of the hook and adapted to slide thereon, said member having an internal locking chamber comprising an enlarged opening at one end connecting by a locking shoulder to a smaller orifice at the other end, with said movable spring member adapted to be locked in said chamber against said locking shoulder whereby said closure member is held in position to close the hook.

WALTER E. OSTER.